Dec. 14, 1965  E. F. SEILER ETAL  3,223,911
MOTOR SPEED CONTROL SYSTEM
Filed Aug. 1, 1962  2 Sheets-Sheet 1
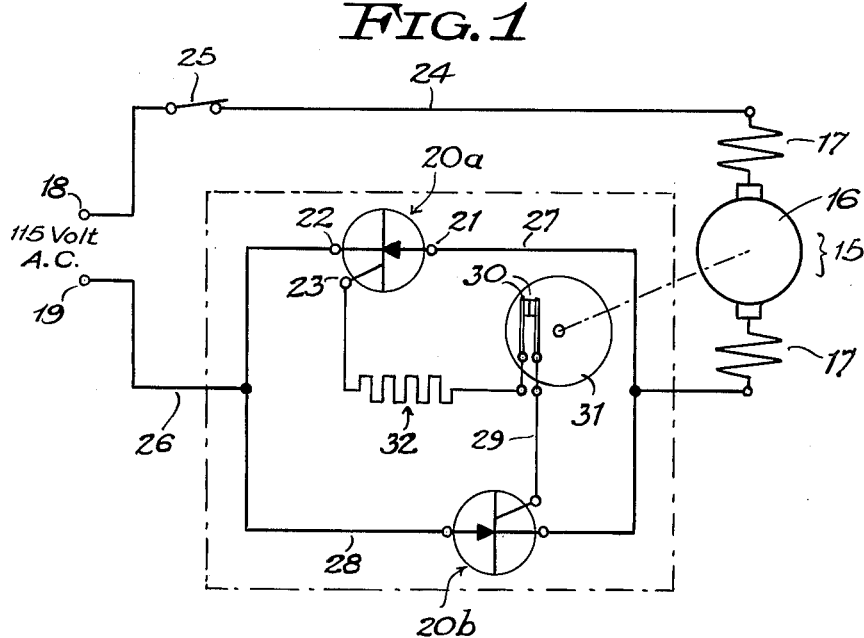
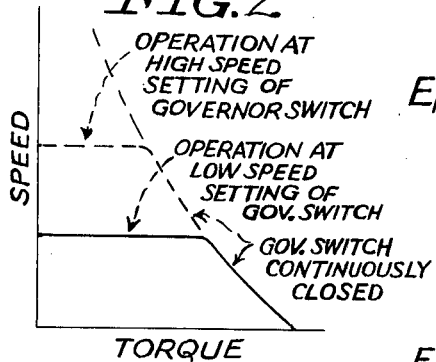
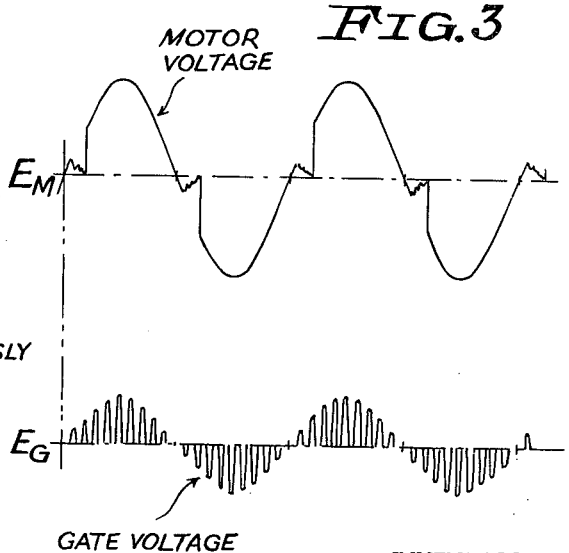
INVENTORS
ERICK F. SEILER
AND ROBERT A. SENG
BY
Christopher A. Waal
ATTORNEY Dec. 14, 1965   E. F. SEILER ETAL   3,223,911
MOTOR SPEED CONTROL SYSTEM
Filed Aug. 1, 1962                    2 Sheets-Sheet 2

INVENTORS
ERICK F. SEILER
BY AND ROBERT A. SENG
Christopher L. Waal
ATTORNEY

3,223,911
MOTOR SPEED CONTROL SYSTEM
Erick F. Seiler and Robert A. Seng, Milwaukee, Wis., assignors to Lee Engineering Company, Milwaukee, Wis., a corporation of Wisconsin
Filed Aug. 1, 1962, Ser. No. 213,928
10 Claims. (Cl. 318—325)

This invention relates to speed controlling or regulating systems for electric motors.

Semiconductor devices in the form of solid-state controlled rectifiers, particularly silicon controlled rectifiers, have been proposed for use in various power control systems, including motor speed control systems. These rectifiers, also known as PNPN controlled rectifiers, include a gate lead or terminal into which a relatively small gate or trigger current is injected to initiate conduction of load current. The forward voltage drop through a controlled rectifier of this type is relatively low, being on the order of 1 volt.

It is an object of the present invention to provide an improved and simplified motor speed controlling or regulating system incorporating solid-state controlled rectifier means and in which the gate signal for firing the rectifier means is controlled by governor switch means responsive to motor speed, the system affording close speed regulation of the motor under varying loads and insuring high efficiency operation.

Anther object is to provide a motor speed control system of this character which will minimize dissipative power losses, insure long life for the contacts of the governor switch means, and reduce motor heating and noise.

Still another object is to provide a motor speed control system which is particularly suitable for use with an alternating current motor, such as of the series or universal type.

A further object is to provide a motor speed control system in which the governor switch means controlling the gate signal has a relatively high operating frequency which is substantially greater than the line frequency in the case of an alternating current system.

A further object is to provide an improved motor speed control system by which direct-current motors can be efficiently operated from an alternating current source.

A further object is to provide a motor speed control system utilizing a direct-current source and solid-state controlled rectifier means and including novel and improved means for periodically turning off the rectifier means from conducting condition.

The invention further consists in the several features hereinafter described and claimed.

In the accompanying drawings, illustrating certain embodiments of the invention, FIG. 1 is a schematic wiring diagram of an alternating current motor speed control system of the invention;

FIG. 2 is a speed-torque diagram of the motor, showing two different speed settings;

FIG. 3 is a wave-form diagram showing instantaneous motor voltage and associated gate voltage of the silicon controlled rectifiers when the alternating current motor is in operation under governor switch control;

Figure 4:
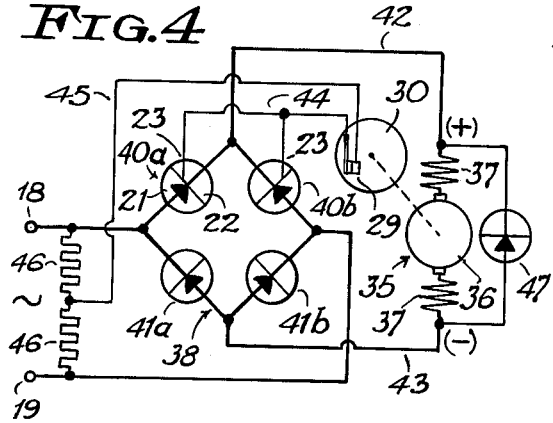
FIG. 4 is a schematic wiring diagram of another motor control system of the invention for supplying full-wave rectified current to a direct-current motor from an alternating current source and for simultaneously controlling the speed of the motor.

In FIG. 1 of the drawings, 15 designates an alternating current motor the speed of which is to be controlled or regulated. The motor is here shown to be of a conventional series of universal type including an armature 16 and a series field winding comprising a pair of series-connected field winding sections 17, the armature being preferably connected between the series field winding sections as usual, and the outer terminals of the series field winding sections forming the motor terminals. However, the invention is also applicable to the control of other types of motors operable on alternating current, such as repulsion motors and shaded-pole motors. The motor is supplied with alternating current from line terminals 18 and 19 such as of a single-phase 115 volt 60-cycle line, through a pair of solid-state controlled rectifiers 20a and 20b, particularly silicon controlled rectifiers, each having anode, cathode and gate terminals 21, 22, and 23, respectively. The line terminal 18 is connected to one of the motor terminals by a conductor 24, here shown to include an on-off switch 25, and the other line terminal 19 is connected to the other motor terminal by a conductor 26 including a pair of parallel branches 27 and 28 in which the load paths of the controlled rectifiers 20a and 20b are respectively interposed in oppositely conducting relation, so that load current will flow through one of the controlled rectifiers on a positive alternation and through the other rectifier on a negative alternation. The gate leads or terminals 23 of the two controlled rectifiers are connected by a gate signal conductor 29 in which are interposed the cooperating normally closed contacts 30 of a motor speed responsive governor switch 31, preferably of the centrifugal type, and a series resistor 32 to limit the gate current. The governor switch is of any suitable type, such as the type disclosed in Lee Patent 1,630,394, issued May 31, 1927, or the adjustable type disclosed in Lee Patent 1,767,146, issued June 24, 1930. Another form of governor switch, and an associated motor arrangement, is disclosed in Lee Patent 2,551,021, issued May 1, 1951. The governor switch contacts preferably open and close at a relatively high frequency, several times the line frequency, for example 300 to 1000 cycles per second. Since the governor switch is required to handle only a very small current, it can be of relatively small size.

By way of example, in the case of a motor rated at ⅓ horse-power, the silicon controlled rectifiers may have a rating of about 5 amperes average forward current, and the resistor 32 may have a value of 10,000 to 30,000 ohms. A value of 16,000 ohms has been found suitable in one specific system. The gate voltage may have a value of 1 to 2 volts, and the gate current is normally only a few milliamperes.

In the operation of the motor system of FIG. 1, the motor is started from rest by applying line voltage to the system. The governor switch contacts 30 remain closed during the acceleration period of the motor, load current then flowing as represented by the lower sloping part of the speed-torque curve of FIG. 2, until the motor attains its governed speed. A positive potential applied to the cathode of one or the other of the controlled rectifiers 20a and 20b causes a small leakage current to flow in the rectifier, this current passing through the current-limiting resistor 32 and closed governor switch contacts 30 and through the gate terminal of the other rectifier to establish a sinusoidal gate signal. The frequency of the gate signal is the same as that of the line frequency. In the case of silicon controlled rectifiers rated at about 5 amperes average forward current, the maximum value of the signal voltage is of the order of one volt and is generally much less. A short time after the line voltage rises from a zero point of the cycle, one of the controlled rectifiers is fired by the injection of gate current, causing this rectifier to become conducting during a large conduction angle. Current then flows through this rectifier in one direction during most of one alternation, and through the other rectifier in the other direction during most of the succeeding alternation, constituting an alternating load current which flows through the motor. This current cycle is repeated indefinitely, causing the motor to accelerate to its governed speed. When the predetermined governed speed is reached, represented by the lower horizontal speed line of FIG. 2, the centrifugal governor switch contacts 30 begin to open and close at a rapid rate, preventing further rise of motor speed by controlling the gate current and thus limiting the load current flowing through the rectifiers. The opening and closing of the governor switch contacts chops the small sinusoidal gate signal voltage into a series of impulses as represented in the lower part of FIG. 3. Upon the initial rising portion of the sinusoidal gate signal wave, the first few pulses lack sufficient amplitude or power to enable the flow of sufficient gate current to fire the rectifiers. Consequently, no load current flows during the initial portion of each line voltage alternation.

The number of pulses into which the gate signal is chopped by governor switch action is a function of both speed and load. At lower speeds and light loads, fewer pulses are available to fire the controlled rectifiers, and at very low speeds no conduction may occur in the rectifiers during some cycles. As the motor load is increased at a low motor speed, more gate current is injected, and at some point the rectifiers will pass load current during all cycles. Upon further increase in motor load the conduction angle of the rectifier is increased until eventually the motor drops out of governor control, the governor switch remaining closed. At a higher governed motor speed, such as that represented in the upper horizontal line of FIG. 2, a similar series of events occurs under load changes, but the maximum available torque range to drop-out is smaller. The proportion of the open and closed periods of the governor switch cycle will vary with the load, from about 40% to 60% of the total contact cycle, the contacts remaining closed for the longer periods with heavier motor loads. The governor switch is preferably of the rotary centrifugal type, as shown, so as to provide a good speed regulation. However, a governor switch of the brushless type, using non-rotating contacts, may also be used. One form of the latter switch is disclosed in Lee Patent 1,857,202, issued May 10, 1932.

The motor speed control system of FIG. 1 also provides a measure of undervoltage protection. In the case of one system normally rated at 115 volts, it has been found that a minimum line voltage of 70 to 90 volts is required to operate the motor, depending on the value of the resistor 32.

The two silicon controlled rectifiers 20a and 20b and the resistor 32 may be grouped in a small package or subassembly for association with the motor, requiring only connections to the line and the motor and to the relatively small governor switch 31 driven by the motor.

In the system shown in FIG. 1 the entire motor load current is supplied through the controlled rectifiers. However, the section of the system enclosed in the broken line rectangle, which comprises the two controlled rectifiers and the speed-responsive gate signal circuit means, may be used to control or supply a part of a motor load. By way of example, it is known in the art to control the speed of a wound rotor induction motor by the use of centrifugal current-carrying switch means opening and closing one or more of the rotor windings. The improved speed-responsive switching means of the present invention can be used for this purpose, thus eliminating the disadvantages of conventional centrifugal switches and permitting speed control of larger motors.

Figure 6:
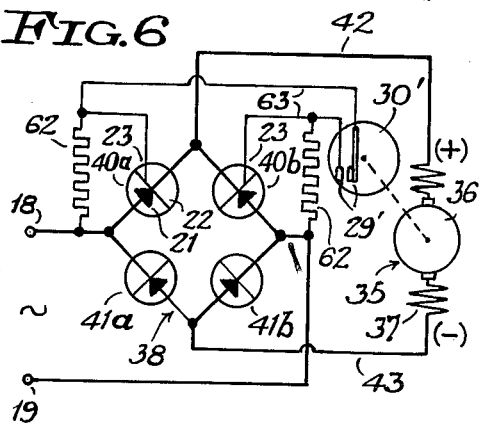
FIG. 6 is a schematic wiring diagram of a control system similar to that of FIG. 4 but with a different arrangement for controlling the gate signal current for the controlled rectifiers.
Figure 5:
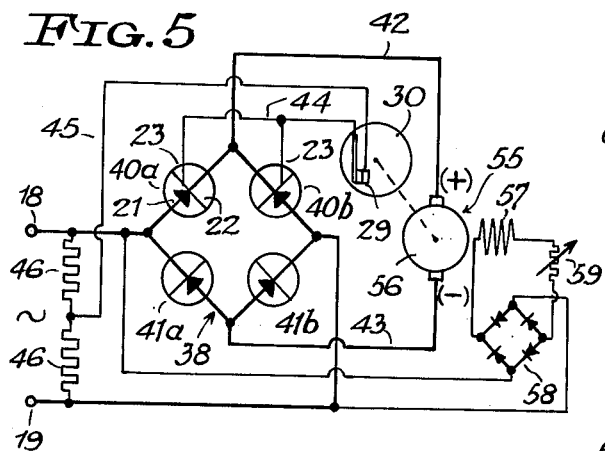
FIG. 5 is a schematic wiring diagram of a control system similar to that of FIG. 4 but arranged for a shunt wound motor.

The modified motor speed control systems of FIGS. 4, 5, and 6 provide both speed control and full-wave rectification and enable the controlled operation of direct-current motors, such as A.C. and D.C. series motors, shunt motors, and permanent magnet motors, from an alternating current source.

In the system of FIG. 4, a direct-current motor 35, here shown to be of the series or universal type with an armature 36 and field winding 37, is connected to alternating current line terminals 18 and 19 through a full-wave bridge rectifier circuit 38 two adjacent legs of which consist of silicon controlled rectifiers 40a and 40b and the two other legs of which consist of silicon diodes 41a and 41b. One line terminal is connected to the rectifier input terminal formed by the junction between the anode of the silicon controlled rectifier 40a and the cathode of the adjacent diode 41a, and the other line terminal is connected to the similar input junction between the other silicon controlled rectifier 40b and the adjacent diode 41b. The two output terminals of the bridge are connected to the motor terminals by conductors 42 and 43. As in FIG. 1, each of the controlled rectifiers has anode, cathode and gate terminals 21, 22, and 23, respectively. The gate terminals of the two controlled rectifiers are connected together by a conductor 44 which also is connected to one of the contacts 29 of a normally closed centrifugal governor switch 30, like that of FIG. 1, driven or actuated by the motor, and the other contact of the governor switch is connected by a conductor 45 to the junction of two current-limiting resistors 46 connected in series across the line terminals. These two resistors may be formed by a center-tapped resistance unit. A value of 15,000 ohms for each resistor 46 has been found suitable for use with a 115 volt alternating current source supplying a fractional H.P. motor through rectifier elements having an average forward current of about five amperes.

In some instances a silicon diode 47 is shunted across the motor in opposing relation to the applied voltage to permit a local circulation of current pulses incident to energy storage in the motor under changing voltage conditions.

In the operation of the system of FIG. 4, assuming the governor switch contacts to be closed, the controlled rectifiers 40a and 40b are alternately fired by gate current flowing from the junction terminal of the pair of resistors 46 through the governor switch contacts to the rectifier gates and then to the line terminals when they are negative. The motor 35 is thus supplied with full-wave rectified current through the bridge rectifier 38. When the line terminal 18 is positive, load current flows therefrom through the triggered rectifier 40a, the motor 35, the diode 41b and back to the line terminal 19. When the line terminal 19 is positive, the load current path includes the triggered rectifier 40b and the diode 41a. When the motor accelerates to the predetermined governed speed the governor switch contacts 29 open, thus interrupting the gate current and stopping further flow of motor current to limit the motor speed. A very slight drop in motor speed permits reclosing of the governor contacts, thus momentarily restoring motor current and maintaining the motor speed within close limits. When the motor shunting diode 47 is present, energy stored in the motor windings may cause periodical flow of current pulses through the diode during fall of the voltage impressed on the motor.

The system of FIG. 4 is also applicable to the control of a permanent magnet motor.

The motor speed control system of FIG. 5 is similar to that of FIG. 4 except that the full-wave rectifier supplies direct current to the armature 56 of a shunt wound motor 55, and the shunt field 57 is supplied with unidirectional current through a full-wave bridge rectifier 58 formed by silicon diodes, the input terminals of the field supply rectifier being connected to the line terminals and the output terminals thereof being connected to the shunt field terminals. A variable resistor 59 connected in series with the shunt field winding provides for extension of the governed speed range. It is also possible to supply the shunt field current through half-wave rectifying means.

The operation of the system of FIG. 5 is substantially the same as that of FIG. 4, except for the different operating characteristics of the shunt wound motor. In this system, it will be noted that only a part of the total motor current is supplied through the controlled rectifier bridge circuit. When the system of FIG. 5 is used with a compound motor, the series field thereof is connected as in FIG. 4, and the shunt field is separately excited as in FIG. 5.

The motor speed control system of FIG. 6 is generally similar to that of FIG. 4, the system including a full-wave bridge rectifier circuit 38 connected between the line and the motor, as in FIG. 4, but having a different gate signal circuitry. A pair of resistors 62 each have one terminal connected to a line terminal and the other terminal connected to the gate terminal of the adjacent silicon controlled rectifier, and the two gate terminals are connected by respective conductors 63 to normally open contacts 29' of an "inverted" governor switch 30' driven or actuated by the motor, the governor switch contacts closing when the motor attains a predetermined governor speed to render the gate current ineffective. For certain types of controlled rectifier elements supplying fractional horsepower motors a resistance of 7,500 to 10,00 ohms has been found suitable for each of the resistors 62. Smaller resistance values are selected when the system is used for larger motors.

In the operation of the system of FIG. 6, a small gate signal current alternately flows through the resistors 62 from the alternately positive line terminals so as to fire the rectifiers during the open condition of the governor switch contacts 29', and when these contacts close at a predetermined governed speed the gate current is, in effect, short-circuited or reduced to prevent firing of the rectifiers. At the governed speed, the governor switch operates at a suitable high frequency to open and close the gating circuit, so as to maintain the predetermined motor speed within close limits.

Figure 7:
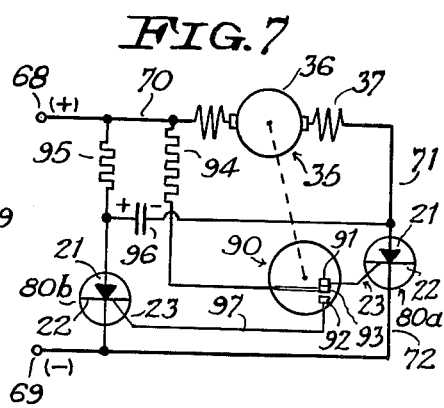
FIG. 7 is a schematic wiring diagram of a motor speed control system of the invention in which the motor is supplied with current from a direct-current source through solid-state controlled rectifier means.

The modified form of motor speed control system shown in FIG. 7 is arranged for operating a motor of the direct-current type at a governed speed from direct-current line terminals 68 and 69 by the use of silicon controlled rectifier means, and provides for periodically turning off the flow of current through the rectifier means. The positive line terminal 68 is connected by a conductor 70 to one terminal of a direct-current motor 35, here shown to be of the series type. The other motor terminal is connected by a conductor 71 to the anode 21 of a silicon controlled rectifer 80a, and the cathode 22 of this rectifier is connected to the negative line terminal of a conductor 72, so that when the controlled rectifier is in the conducting state load current will be supplied to the motor. A speed responsive switch 90 of the centrifugal type is driven by the motor, and has a pair of fixed contacts 91 and 92 cooperating with an interposed spring-biased movable contact 93 having a small amplitude of vibration, the movable contact normally engaging the fixed contact 91. The fixed contact 91 is connected to the gate terminal 23 of the controlled rectifier, and the movable contact 93 is connected to the positive line terminal through a resistor 94 to limit the gate current which conditions the controlled rectifier to a conducting state.

To turn off the controlled rectifier after the gate circuit is interrupted at the governor switch contacts 91 and 93 provision is made for reducing the anode voltage of the rectifier. A resistor 95 has one terminal connected to the positive line terminal, and the other resistor terminal is connected to the anode 21 of an auxiliary silicon controlled rectifier 80b, the cathode 22 of which is connected to the negative line terminal. A commutating capacitor 96 is connected between the anodes of the two controlled rectifiers, and the gate 23 of the rectifier 80b is connected to the normally open contact 92 of the governor switch by a conductor 97. The resistor 95 is preferably smaller in resistance than the resistor 94, a resistance ratio of 10 to 1 being found suitable. The commutating capacitor 96 has a suitable capacitance, for example about 2 to 4 microfarads, so as to obtain a reasonably low time constant.

In the operation of the speed control system of FIG. 7, the governor switch contacts 91 and 93 are closed when the motor starts from rest, thus firing the controlled rectifier 80a and causing direct current to flow through this rectifier. At this time the auxiliary controlled rectifier 80b is in a non-conducting condition, and the capacitor 96 becomes charged to full line voltage through the resistor 95. The motor thereupon accelerates to the governed speed at which the movable governor switch contact 93 leaves the contact 91 and engages the contact 92, thereby firing the auxiliary controlled rectifier 80b. The commutating capacitor 96 is thus discharged, dropping the anode voltage on the controlled rectifier 80a to turn off the latter rectifier. The motor speed then drops slightly, causing the movable contact 93 of the governor switch to leave the contact 92 and to re-engage the contact 91, whereupon the controlled rectifier 80a is again fired to pass motor current. Simultaneously, the capacitor 96 is recharged, and the anode voltage on the auxiliary rectifier 80b momentarily drops to turn off this rectifier. The governor switch operates at a suitable high frequency, thus insuring good speed regulation.

The system of FIG. 7 is also applicable to the contact of other types of direct-current motors, such as permanent magnet motors and shunt and compound motors. A shunt field winding can be energized directly from line terminals, somewhat as in FIG. 5 except that no rectifier is required.

Figure 8:
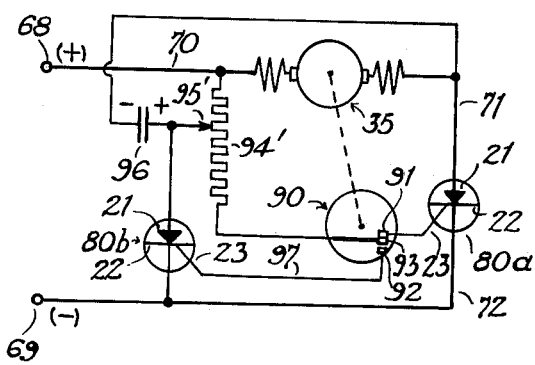
FIG. 8 is a schematic wiring diagram of a modified motor speed control system similar to that of FIG. 7.

The modified direct-current motor speed control system of FIG. 8 is similar to that of FIG. 7, except that a single resistor 94', connected as in FIG. 7, takes the place of the two resistors 94 and 95 of FIG. 7, and has a tap 95' to which is connected the anode of the capacitor-discharging auxiliary rectifier 80b. The commutating capacitor 96 is connected between the tap 95' and the negative terminal of the motor. The operation of the system of FIG. 8 is substantially the same as that of FIG. 7.

Figure 9:
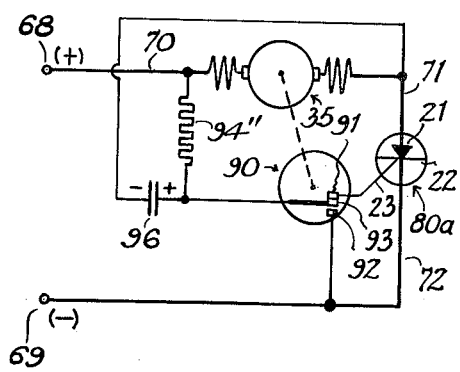
FIG. 9 is a schematic wiring diagram of another modified motor speed control system similar to that of FIG. 7.

The modified direct-current control system of FIG. 9 is similar to that of FIG. 8 except that only a single current-limiting gate resistor 94'' is provided, connected as in FIG. 7, and the capacitor-discharging auxiliary rectifier is omitted. Instead, the commutating capacitor 96 is connected between the negative motor terminal and the movable governor switch contact 93, and is discharged to the negative line terminal through the normally open contact 92 of the governor switch when the movable contact 93 engages the contact 92. The operation of the system of FIG. 9 is otherwise generally the same as that of FIG. 7.

In the form of motor speed control system shown in FIG. 1, the silicon controlled rectifiers pass motor current directly from the current source. However, as hereinbefore noted, a similar arrangement can be used for controlling the current in a secondary or rotor winding of a motor to regulate motor speed, the rotor winding providing a source of gate current. In the case of a conventional wound rotor induction motor with one or more phase windings on the rotor connected to the slip rings, the rectifying means may be external to the rotor. However, it is also possible to mount the solid-state controlled rectifying means on the rotor to rotate therewith, thus eliminaing the need for slip rings. One type of speed-regulated wound rotor induction motor to which the invention may be applied is disclosed in Lee Patent 2,748,333, issued May 29, 1956.

We claim:

1. In a system for controlling the speed of an alternating current motor supplied from an alternating current source, a pair of solid-state controlled rectifiers each having an anode, a cathode, and a gate, said rectifiers being connected in circuit with said motor and when in conducting state alternately passing positive and negative current alternations, and a gate circuit connecting the gates of said rectifiers to be traversed by leakage current through said rectifiers and including a governor switch responsive to motor speed and a current-limiting resistor in series with said switch, said governor switch when closed permitting flow of gate current alternately firing said rectifiers.

2. In a system for controlling the speed of an alternating current motor supplied from an alternating current source, a pair of solid-state controlled rectifiers each having an anode, a cathode, and a gate, said rectifiers being respectively disposed in a pair of parallel branches of a conducting path connected in circuit with the motor and being arranged in oppositely conducting relation in said branches for passing alternate positive and negative current alternations, and a gate circuit conductor connecting the gates of said rectifiers to be traversed by leakage current through said rectifiers and including a governor switch responsive to motor speed and a current-limiting resistor in series with said switch, said governor switch when closed permitting flow of gate current alternately firing said rectifiers, and said governor switch having a normal frequency of current interruption substantially higher than the frequency of said source.

3. In a system for controlling the speed of a direct-current motor supplied from an alternating current source, a full-wave rectifier circuit connecting said source and said motor, said rectifier circuit including a pair of solid-state controlled rectifiers each having an anode, a cathode, and a gate, and gate circuit means connected to the gates of said controlled rectifiers to supply gate current thereto and including a governor switch responsive to motor speed, said governor switch having a normal frequency of current interruption substantially higher than the frequecy of the current source.

4. In a motor speed control system, a source of alternating current, a full-wave bridge rectifier circuit having input and output terminals, said source being connected to said input terminals, a direct current motor connected to said output terminals, said bridge rectifier circuit including a pair of diodes in two adjacent legs and a pair of solid-state controlled rectifiers in the other two legs, each controlled rectifier having an anode, a cathode, and a gate, and gate circuit means connected to the gates of said controlled rectifiers to supply gate current thereto and including a normally closed governor switch responsive to motor speed, said gate circuit means further including a resistor connected across the input terminals and having an intermediate tap connected to said gates through said governor switch.

5. In a motor speed control system, a source of direct current having positive and negative line terminals, an electric motor and a solid-state controlled rectifier connected in series across the line terminals, said controlled rectifier having an anode, a cathode, and a gate, said cathode being connected to the negative line terminal, and said anode being connected to a terminal of the motor, gate circuit means comprising a governor switch responsive to motor speed and a resistor in series therewith connected between the positive line terminal and said gate to supply periodic pulses of gate current to said rectifier, and means controlled by said governor switch for periodically turning off said rectifier.

6. In a motor speed control system, a source of direct current having positive and negative line terminals, an electric motor and a solid-state controlled rectifier connected in series across the line terminals, said controlled rectifier having an anode, a cathode, and a gate, said cathode being connected to the negative line terminal, and said anode being connected to a terminal of said motor, a governor switch responsive to motor speed and having normally closed and normally open contacts, one of said normally closed contacts being conected to said gate, a resistor connected between the positive line terminal and the cooperating normally closed contact and forming a current path with said gate for firing said rectifier, a second resistor having a terminal connected to the positive line terminal, a commutating capacitor having one terminal connected to the other terminal of said second resistor and the other terminal connected to the junction of said rectifier anode with said motor terminal for charging said capacitor, and means controlled by said governor switch for discharging said capacitor upon closing of the normally open switch contacts to turn off said rectifier.

7. In a motor speed control system, a source of direct current having positive and negative line terminals, an electric motor and a solid-state controlled rectifier connected in series across the line terminals, said controlled rectifier having an anode, a cathode, and a gate, said cathode being connected to the negative line terminal, and said anode being connected to a terminal of said motor, a governor switch responsive to motor speed and having normally closed and normally open contacts, one of said normally closed contacts being connected to said gate, a resistor connected between the positive line terminal and the cooperating normally closed contact and forming a current path with said gate for firing said rectifier, a second resistor having a terminal connected to the positive line terminal, a commutating capacitor having one terminal connected to the other terminal of said second resistor and the other terminal connected to the junction of said rectifier anode with said motor terminal for charging said capacitor, and capacitor-discharging means including a second solid-state rectifier and a gate circuit supply path therefor including said normally open switch contacts when said last-named contacts are closed.

8. In a motor speed control system, a source of direct current having positive and negative line terminals, an electric motor and a solid-state controlled rectifier connected in series across the line terminals, said controlled rectifier having an anode, a cathode, and a gate, said cathode being connected to the negative line terminal, and said anode being connected to a terminal of said motor, a governor switch responsive to motor speed and having normally closed and normally open contacts, one of said normally closed contacts being connected to said gate, a resistor connected between the positive line terminal and the cooperating normally closed contact and forming a current path with said gate for firing said rectifier, a commutating capacitor connected between a tap of said resistor and the rectifier anode for charging said capacitor, a second solid-state controlled rectifier having its anode connected to said resistor tap and its cathode connected to the negative line terminal, and a conductor connecting the gate of said second rectifier with the normally open contact of said governor switch for discharging said capacitor upon actuation of said switch to thereby connect said resistor to said last-named gate for turning off said first-named rectifier.

9. In a motor speed control system, a source of direct current having positive and negative line terminals, an electric motor and a solid-state controlled rectifier connected in series across the line terminals, said controlled rectifier having an anode, a cathode, and a gate, said cathode being connected to the negative line terminal, and said anode being connected to a terminal of said motor, a governor switch responsive to motor speed and having normally closed and normally open contacts, one of said normally closed contacts being connected to said gate, a resistor connected between the positive line terminal and the cooperating normally closed contact and forming a current path with said gate for firing said rectifier, a second resistor having a terminal connected to the positive line terminal, a commutating capacitor having one terminal connected to the other terminal of said second resistor and the other terminal connected to the junction of said rectifier anode with said motor terminal for charging said capacitor, and means controlled by said governor switch for discharging said capacitor upon closing of the normally open switch contacts to turn off said rectifier, said last-named means including a current path between said normally open contact and the negative line terminal for discharging said capacitor.

10. In a motor speed control system, a source of direct current having positive and negative terminals, an electric motor connected to said terminals through a solid-state controlled rectifier in series therewith, said rectifier having an anode, a cathode, and a gate, said cathode being connected to the negative line terminal and said anode being connected to a terminal of the motor, a governor switch responsive to motor speed and having normally closed and normally open contacts including a movable contact, one of said normally closed contacts being connected to said rectifier gate, a current-limiting resistor connected between the positive line terminal and the movable contact of said governor switch and forming a circuit path with said gate for firing the rectifier, and a commutating capacitor having one terminal connected to said movable contact and the other terminal being connected to the rectifier anode, said normally open contact of said switch being connected to the negative line terminal for discharging said capacitor when engaged by said movable contact.

References Cited by the Examiner
UNITED STATES PATENTS

| | | | |
|---|---|---|---|
| 1,719,492 | 7/1929 | Stoller | 318—325 |
| 2,544,383 | 3/1951 | Hansen | 318—325 |
| 2,935,674 | 5/1960 | Hohne | 318—325 X |
| 2,977,523 | 3/1961 | Cockrell | 318—331 |
| 3,041,478 | 6/1962 | Gabor | 307—90 |
| 3,050,672 | 8/1962 | Alexanderson | 318—331 |
| 3,135,906 | 6/1964 | Pisano | 318—325 |
| 3,143,695 | 8/1964 | Hohne | 318—325 X |

OTHER REFERENCES

Publication: GE SCR Manual, 2nd Edition, Auburn, New York, 1961. TK2798 G49, pp. 40, 95, 96, 125, 126, and 127.

Publication: GE Reprint, Frenzel and Gutzwiller, Solid-State Thyratron Switches Kilowatts. In Electronics, March 28, 1958.

ORIS L. RADER, *Primary Examiner.*